Dec. 17, 1929.  F. W. SCHMIDT  1,739,865
ADVERTISING DEVICE
Filed Feb. 6, 1925
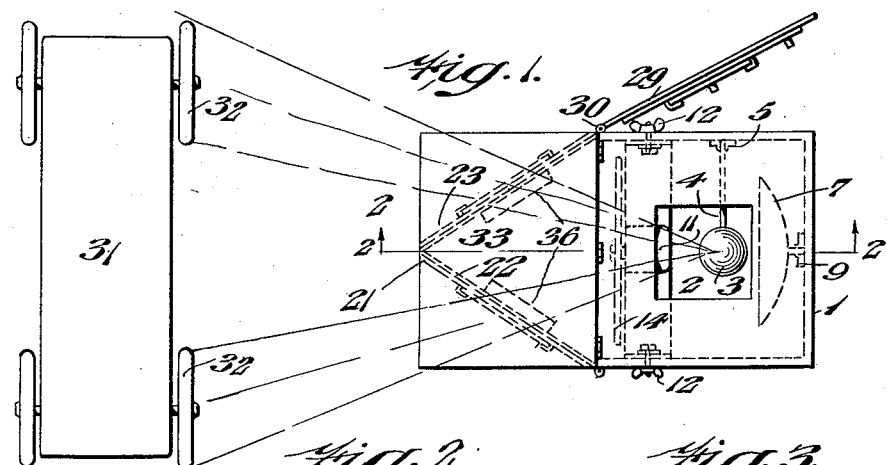
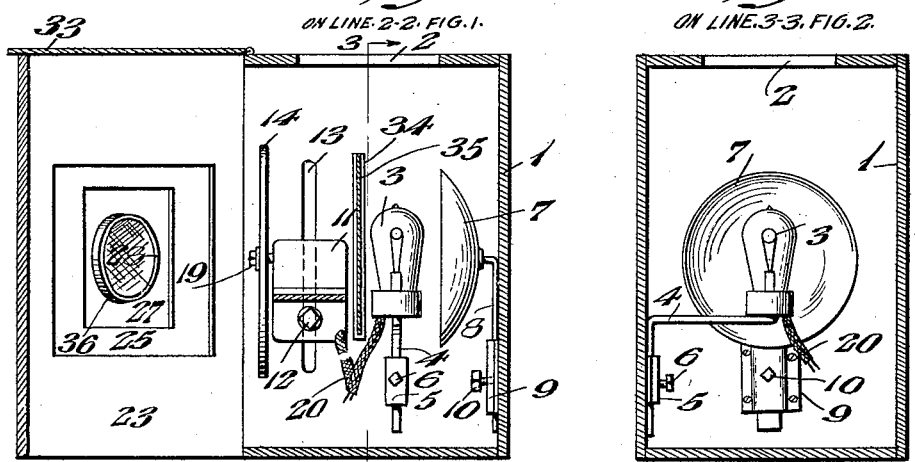
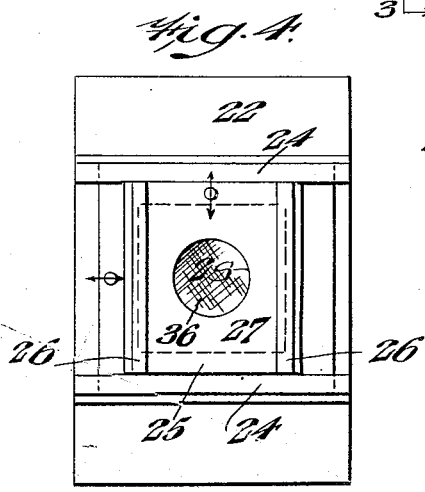
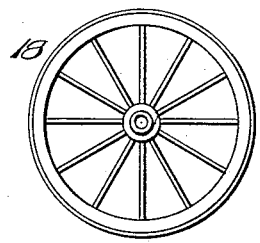
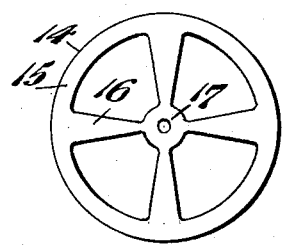
Inventor
Frederick W. Schmidt
By J. Bonsall Taylor
Herbert S. Fairbanks
Attorneys Patented Dec. 17, 1929

1,739,865

UNITED STATES PATENT OFFICE

FREDERICK W. SCHMIDT, OF PHILADELPHIA, PENNSYLVANIA

ADVERTISING DEVICE

Application filed February 6, 1925. Serial No. 7,297.

The object of my present invention is to devise a novel construction and arrangement of an advertising device, which, when in use, will serve to illuminate certain portions of an object or representation of an object in order to give one the impression that such objects or portions thereof are in motion.

It further comprehends a novel advertising device wherein means are provided to project light rays to different portions of an object, and wherein a transparent or opaque blade is slowly revolved in front of the source of light. This blade may be in the form of a revolving disc which may conform to the general shape of the object which is to be illuminated, or it may have any desired configuration.

My invention further comprehends a novel construction of an illuminating device comprising a casing having adjustably mounted therein a source of light, a reflector, and a motor adapted to slowly revolve a disc of a desired configuration, said casing having connected thereto means to cause the light rays to pass to one or more portions of the object which is to be illuminated.

It further comprehends an illuminating device of the character above stated, wherein the casing is provided with a plurality of light directing frames one of which can be arranged in the form of a V and each of said frames have mounted therein an apertured plate or lens, the position of which can be both vertically and laterally adjusted.

Other novel features of construction and advantage will hereinafter more clearly appear in the detailed description and the appended claims.

For the purpose of illustrating the invention, I have shown in the accompanying drawing a typical embodiment of it, which, in practice, will give reliable and satisfactory results. It is, however, to be understood that this embodiment is typical only and that the various instrumentalities of which my invention consists can be variously arranged and organized, and that the invention is not limited to the precise arrangement and organization of these instrumentalities as herein set forth.

Figure 1 is a top plan view of an advertising device embodying my invention and illustrating the rays of light as passing to the wheels of a vehicle.

Figure 2 is a section on line 2—2 of Figure 1.

Figure 3 is a section on line 3—3 of Figure 2.

Figure 4 is a front elevation of a frame having a light opening the position of which is adjustable.

Figure 5 is a plan view of one form of a blade which can be employed.

Figure 6 is a plan view of another form of blade which can be employed.

Similar numerals of reference indicate corresponding parts.

Referring to the drawings:

1 designates the casing of an advertising device embodying my invention. The top of the casing is provided with an opening 2 so that heat from a source of light 3 can escape therethrough. The source of light 3 is preferably an incandescent bulb which is carried by an angle bracket 4, a leg of which is vertically adjustable in a guide 5, and the bracket is secured in its adjusted position by means of a set screw 6. In rear of the source of light 3 is a reflector 7, carried by a bracket 8, which is vertically adjustable in a guide 9, fixed to the rear wall of the casing 1, and a fastening device 10 is provided to fix the bracket 8 in its adjusted position.

11 designates a motor, which preferably has built in it a transformer so that it can be used with a house lighting current, and this motor is secured in its vertically adjusted position by means of fastening devices 12 which pass through slots 13 in the opposite side walls of the casing 1.

14 designates a rotary blade, the contour of which may vary widely in practice in accordance with the results which it is desired to obtain, and it may in practice conform to the contour of the object or portions thereof which are to be illuminated. The blade 14 may be made of any desired material and in some cases it may be made of transparent material, and in other cases it may be made of opaque material. It is preferably, however, made of opaque material having cut out portions so that the light can pass therethrough, and, as shown in Figure 6, it can be said to consist, as illustrated, of a rim 15 having the spokes 16 which are secured to the apertured hub 17; or it may be, for example, in the form of a vehicle wheel 18 as shown in Figure 5. In any case, the hub of the disc or rotary member is adapted to receive the shaft of the motor 11, and it is secured in position, as shown, by means of a nut 19. A conductor 20 forms an electrical connection with the incandescent bulb and also with the motor 11, and the ordinary house or store current can serve as a source of electric power and light supply.

The casing 1 is open at its front, and a hinged frame 21 has one end hinged to the side wall of the casing 1 so that it can be swung into the position seen in dotted lines in Figure 1, and thus form the light controlling members 22 and 23 respectively. Each of these, as for example the member 22, is provided with the laterally extending guides 24, in which is slidable the plate 27 having an opening 28. A frame 29, having a single light opening, is also hinged to a side wall of the casing 1 as at 30, see Figure 1.

31 designates an object having parts 32, such as for example, the wheels which it is desired to illuminate in order to give the impression that they are moving. I preferably provide a cover 33 which extends over the frame 21 when such is used.

I also preferably provide in front of the source of light 3 the guides 34 which are adapted to receive a color filter 35 of any desired color, so that the source of light passing to the object to be illuminated will impart to the object the desired color or colors.

It is within the scope of my invention to make the rotary member 14 of any desired color or of any combination of colors which can have any desired arrangement thereon.

In the use of my novel advertising device, it will be apparent that the motor 11, the source of light 3 and the reflector 7 can be adjusted so that the light will pass through one or more light openings 28 to illuminate one or more portions of the object which it is desired to advertise. The motor 11 is of such construction that the blade 14 will revolve slowly, so that an undulating light will be projected on the wheels 32, for example, and thus give the impression to the eye of the observer that such wheels are revolving.

A lens 36 can be adjusted in order to properly focus a light on a portion of the objects which are to be illuminated or these lenses can be omitted, and the light will then pass through the light opening or openings 28 employed.

The plate 27 which carries a light opening can be laterally and vertically adjusted in order to adjust the path through which the light passes to the object.

It will be understood from the foregoing that in some cases it is advantageous to have the blade 14 of the general contour of the object which is to be illuminated, but this is not essential. The shape and cut outs of the blade 14 may be infinitely varied, and, irrespective of the shape, it will cause the article which is to be advertised or certain portions of the article to be illuminated with light rays of the same or of different colors, so that such parts are brought more vividly to the attention of the observer, or the impression is given to the eye of the observer that certain parts of the object are in motion.

My present device is especially adapted to be placed in show windows of stores in order to attract attention to articles displayed therein for sale.

My present invention is particularly designed to be employed to illuminate the wheels of motor vehicles in order to attract the attention of the general public; and by using a colored plate, such as 35, or by coloring the blade 14, it will be apparent that any desired color effect can be obtained on the portion or portions of the object which is to be illuminated.

If the blade is opaque, it will be apparent that an undulating lighting effect will be produced, and if the article to be illuminated is a revolving object and the blade conforms in its general contour to the shape of such revolving object, it will be apparent that the observer will receive the impression that the wheels are actually turning.

The main advantage of having the light adjustable is to enable one to employ incandescent bulbs of different size so that when desired illumination can be obtained.

It will now be apparent that I have devised a new and useful advertising device which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent, is:

1. An advertising device to give the illusion of motion to stationary parts of a circular object, comprising a casing having one side open, a source of light in said casing, a reflector in rear of said light, a motor mounted in said casing, a blade revolved by said motor in front of said light, and a frame movably carried by said casing to be angularly positioned in front of said open side, and having a light opening through which the light rays pass to the stationary parts of the object to give the illusion that such parts are in motion.

2. An advertising device to give the illusion of motion to stationary parts of a circular object, comprising a casing having one side open, a source of light in said casing, a reflector in rear of said light, a motor mounted in said casing, a blade revolved by said motor in front of said light, and a frame movably carried by said casing to be angularly positioned in front of said open side, and having a plurality of light openings through which the light rays pass to stationary parts of the object to give the illusion that such parts are in motion.

3. An advertising device to give the illusion of motion to stationary parts of a circular object, comprising a casing having one side open, a source of light in said casing, a reflector in rear of said light, a motor mounted in said casing, a blade revolved by said motor in front of said light, a colored plate between said light and blade, and a frame movably carried by said casing to be angularly positioned in front of said open side, and having a light opening through which the light rays pass to the stationary parts of the object to give the illusion that such parts are in motion.

4. An advertising device to give the illusion of motion to stationary parts of a circular object, comprising a casing having an open side, a source of light in said casing, a reflector in rear of said light, a blade in front of said light to vary the passage of the light rays, means to slowly revolve said blade, a frame hinged to said casing and movable to provide a plurality of members disposed at an angle to each other in front of said open side, and an apertured element for each member each of which is capable of adjustment to cause light rays from said light to pass to desired portions of the object to be illuminated to give the illusion that such parts are in motion.

5. An advertising device to give the illusion of motion to stationary parts of a circular object, comprising a casing, a source of light therein, a reflector in rear of said light, a revoluble blade in front of said light and having the general contour of an object to be illuminated, means to revolve said blade, a frame having a light opening and hinged to said casing to cause the rays of light from said source to pass through said sight opening in a predetermined path to parts of said objects to give the illusion that such parts are in motion.

6. An advertising device to give the illusion of motion to stationary parts of a circular object, comprising a casing, a source of light therein, a reflector for said light, a revoluble blade in front of said light, means to revolve said blade, a frame hinged to said casing and capable of being positioned in front of said blade, and a vertically and laterally adjustable lens carrier on said frame.

FREDERICK W. SCHMIDT.